(12) United States Patent
Bargeron et al.

(10) Patent No.: US 7,715,980 B2
(45) Date of Patent: May 11, 2010

(54) SCHEMATIC DESTINATION MAPS

(75) Inventors: David M. Bargeron, Seattle, WA (US); Maneesh Agrawala, Berkeley, CA (US); David H. Salesin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1020 days.

(21) Appl. No.: 11/420,550

(22) Filed: May 26, 2006

(65) Prior Publication Data

US 2007/0112507 A1 May 17, 2007

Related U.S. Application Data

(60) Provisional application No. 60/738,162, filed on Nov. 17, 2005.

(51) Int. Cl.
*G01C 21/00* (2006.01)

(52) U.S. Cl. ............... 701/208; 701/200; 701/209; 701/211; 340/995.1; 340/995.14

(58) Field of Classification Search .......... 701/208, 701/200, 209, 211; 340/995.1, 995.14
See application file for complete search history.

(56) References Cited

U.S. PATENT DOCUMENTS

| | | | | |
|---|---|---|---|---|
| 3,770,347 | A * | 11/1973 | Ambrose et al. | 355/43 |
| 5,913,918 | A * | 6/1999 | Nakano et al. | 701/208 |
| 6,282,493 | B1 * | 8/2001 | Kitagawa et al. | 701/211 |
| 6,424,933 | B1 * | 7/2002 | Agrawala et al. | 703/2 |
| 6,668,226 | B2 * | 12/2003 | Sutanto | 701/208 |
| 6,952,647 | B2 * | 10/2005 | Hasegawa et al. | 701/209 |
| 6,952,661 | B2 * | 10/2005 | Agrawala et al. | 703/2 |
| 7,076,409 | B2 * | 7/2006 | Agrawala et al. | 703/2 |
| 7,330,787 | B2 * | 2/2008 | Agrawala et al. | 701/208 |
| 7,392,133 | B2 * | 6/2008 | Maruyama et al. | 701/208 |
| 7,437,279 | B2 * | 10/2008 | Agrawala et al. | 703/6 |
| 7,458,029 | B2 * | 11/2008 | Agrawala et al. | 715/744 |
| 7,496,484 | B2 * | 2/2009 | Agrawala et al. | 703/2 |
| 7,523,405 | B2 * | 4/2009 | Robertson et al. | 715/766 |
| 7,542,882 | B2 * | 6/2009 | Agrawala et al. | 703/2 |
| 2005/0140524 | A1 | 6/2005 | Kato et al. | |
| 2005/0182604 | A1 * | 8/2005 | Agrawala et al. | 703/2 |
| 2007/0112507 | A1 * | 5/2007 | Bargeron et al. | 701/208 |

OTHER PUBLICATIONS

Agrawala, et al. "Rendering Effective Route Maps: Improving Usability Through Generalization" (2001) Proceedigns of ACM SIGGRAPH 2001, pp. 241-250.
Christensen, et al. "An Empirical Study of Algorithms for Point-Feature Label Placement" (1995) ACM Transactions on Graphics, pp. 203-232.
De Berg, et al. "Computational Geometry: Algorithms and Applications" (1997) Springer.
Edmondson, et al. "A General Cartographic Labeling Algorithm" Technical Report TR-96-04, Mitsubishi Electric Research Laboratories, Cambridge Research Center, Cambridge, MA, (1996).
IMHOF. Positioning Names on Maps (1975) The American Cartographer, 2(2), pp. 128-144.

\* cited by examiner

*Primary Examiner*—Thomas G Black
*Assistant Examiner*—Wae Louie
(74) *Attorney, Agent, or Firm*—Lee & Hayes, PLLC

(57) ABSTRACT

The claimed subject matter provides a system and/or a method that facilitates automatically producing an enhanced schematic destination map to provide directions to a destination related to geography. An interface component can receive at least one geographic destination. A map generator can automatically create an enhanced schematic destination map utilizing a hierarchy of road sets to provide at least one route including at least one road to the geographic destination.

18 Claims, 14 Drawing Sheets

SCHEMATIC DESTINATION MAPS

CROSS REFERENCE TO RELATED APPLICATION(S)

This application claims the benefit of U.S. Provisional Patent Application Ser. No. 60/738,162 filed on Nov. 17, 2005, entitled "SCHEMATIC DESTINATION MAPS." The entirety of which application is incorporated herein by reference

BACKGROUND

Electronic storage mechanisms have enabled accumulation of massive amounts of data. For instance, data that previously required volumes of books to record data can now be stored electronically without expense of printing paper and with a fraction of space needed for storage of paper. In one particular example, deeds and mortgages that were previously recorded in volumes of paper can now be stored electronically. Moreover, advances in sensors and other electronic mechanisms now allow massive amounts of data to be collected in real-time. For instance, GPS systems track a location of a device with a GPS receiver. Electronic storage devices connected thereto can then be employed to retain locations associated with such receiver. Various other sensors are also associated with similar sensing and data retention capabilities.

Today's computers also allow utilization of data to generate various maps. For instance, Internet mapping applications allow a user to type in an address or address(es), and upon triggering a mapping application a map relating to an entered address and/or between addresses is displayed to a user together with directions associated with such map. These maps are conventionally static—for instance, if the maps are displayed on a portable mechanism (e.g., a smart phone, a PDA, . . . ), they do not alter with sensed change in location of the user. Moreover, mapping applications that do alter display dynamically and/or graphically traverse a particular route do not alter depth of such view. Thus, a user is not provided with an optimal context with respect to a traversed route.

Due to their high quality and ease of use, a schematic destination map can be used for many important real-world purposes. Event organizers (e.g., wedding planners) provide special-purpose maps to show invitees how to get to the event location. Franchise chains and shopping districts provide schematized maps which highlight store locations. Airports and tourist agencies often provide simplified maps to show out-of-town visitors the best/easiest ways around town. Corporations, universities, hospitals, zoos, and other campus-based organizations provide maps to show the position and relationship of important buildings and paths on respective campuses Consider the amount of detail depicted in each type of map. Literal destination maps lie at one extreme, and include a constant density of detail. Usually, the software that produces these maps displays everything that is visible at a given zoom level, without regard to whether it is relevant to reaching the specified destination or not. For example, in a conventional literal destination map, many local roads, parks, and neighborhoods are shown even though such details offer users little or no help when it comes to finding the destination.

At the other extreme of detail lies the schematic route map. It depicts a single route between a single origin and a single destination. Very little additional contextual information is provided in the map, and if the particular route is unavailable for some reason (e.g., construction, traffic jam, accident, etc.), or if the user strays from the route, or if the user needs additional information near the destination (such as potential parking locations), there is very little help available.

Another dimension of map design to consider is the fidelity with which spatial relationships are represented. Literal destination maps display geographical features at a single common scale so that they appear realistically proportional to one another, as if they were directly copied from an aerial photograph. As a result, many important details (e.g., local access roads to the destination) are either completely invisible or rendered too small to be useful.

Moreover, the "LineDrive" schematized route map for a particular destination depicts only a single route from a single origin to the destination with minimal additional text. The literal destination map can include irrelevant details which clutter the display, and obscure many other important details. However, "LineDrive" maps and other conventional schematized route maps depict the region surrounding a destination with a constant scale and density of detail which frequently obscures important details and/or includes too many extraneous features. Additionally, to produce such maps, mapmakers carefully determine which subset of roads and other geographic features supports the purpose of the map, and produce such maps by hand.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate automatically generating an enhanced schematic destination map. An automatic schematic map generator can automatically create an enhanced schematic destination map that provides multiple routes to a particular destination utilizing a hierarchy of roads. The automatic schematic map generator can receive geographic data and data related to a destination via an interface, wherein selective filtering utilizing the hierarchy of roads can provide at least one route to the destination. The data related to the destination can be, received from a user, a location on a map, an address, a street, an intersection, a store, a city, a county, a country, a building, any data related to a point on a map, etc. Moreover, the automatic schematic map generator can automatically create the enhanced schematic destination map utilizing geographic data surrounding the destination, wherein the geographic data can be any data related to the geography of, for instance, the world, a state, a city, a county, a region, and/or any suitable geographic data surrounding the destination.

The enhanced schematic destination map can be a stream-lined map that includes at least one of the following improvements: easy-to-read routes, de-emphasized details, excluded irrelevant data, distinct and/or simplified geographic features, eliminates clutter, easy-to-use, and/or multiple routes for a destination. It is to be appreciated that the enhanced schematic destination map can be stream-lined based at least in part upon an evaluation of geographic data surrounding the destination. In other words, an enhanced schematic destination map related to a first destination can include disparate improvements (e.g., de-emphasized details, excluded irrelevant data, distinct and/or simplified geographic features, eliminates clutter, multiple routes for a destination, etc.) in comparison to an enhanced schematic destination map 106 related to a second destination.

In accordance with one aspect of the claimed subject matter, the automatic schematic map generator can include a data selection component that hierarchically selects and/or filters data to provide the enhanced schematic destination map. The data selection component can utilize a road set, wherein the road sets can be, for example, a large road set, a medium road set, and a local road set, such that the sets can be based upon road size, speed limit, lanes within the road, etc. For instance, the large road set can include interstate highways; the medium road set can include arterials, state highways, and other major roads within the boundaries of the large road set; and the local road set can include local streets within the boundaries of the medium road set.

In accordance with another aspect of the claimed subject matter, the automatic schematic map generator can include a shape component that simplifies geometry associated with the roads and/or hierarchically selected geographic data from the data selection component. The shape component can simplify the geometry of individual roads utilizing shape simplification. Moreover, the automatic schematic map generator can include a road layout component that can structure the road layout as, for instance, a stochastic search. The search space consists of different possible 2D layouts of the road network data. The search can be conducted with a simulated annealing algorithm. Moreover, the road layout component can utilize various distortions with soft constraints, wherein such soft constraints can be based upon topology, road turns, and/or road geometry. In addition, various perturbations can be utilized to generate a layout associated with the roads and the destination. For instance, articulation point-based scaling can be utilized.

In accordance with another aspect of the innovation described herein, the automatic schematic map generator can further include a label component that populates and/or decorates the enhanced schematic destination map with additional information. The label component can populate the enhanced schematic destination map with at least one of a road label, a prompt road label, a callout, and a landmark while providing clarity and readability for such labels. In other aspects of the claimed subject matter, methods are provided that facilitate creating an enhanced schematic destination map of a destination.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
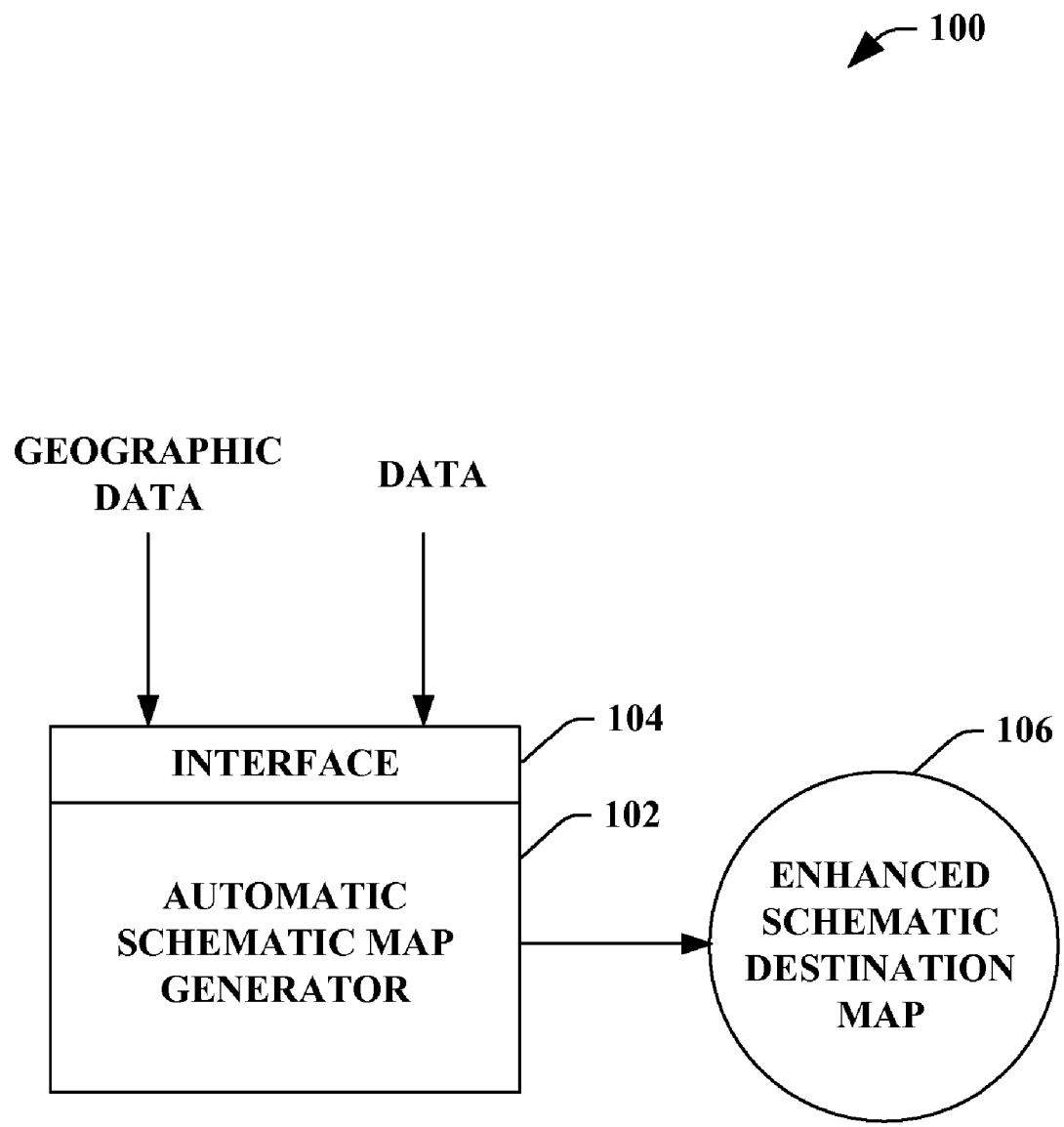
FIG. 1 illustrates a block diagram of an exemplary system that facilitates automatically generating an enhanced schematic destination map.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "generator," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates automatically generating an enhanced schematic destination map. The system 100 includes an automatic schematic map generator 102 that can receive data related to at least one destination, wherein an enhanced schematic destination map 106 can be created based at least in part upon geographic data. The enhanced schematic destination map 106 can be a stream-lined map that includes at least one of the following improvements: easy-to-read routes, de-emphasized details, excluded irrelevant data, distinct and/or simplified geographic features, eliminates clutter, easy-to-use, and/or multiple routes for a destination. It is to be appreciated that the enhanced schematic destination map 106 can be streamlined based at least in part upon an evaluation of geographic data surrounding the destination. In other words, an enhanced schematic destination map 106 related to a first destination can include disparate improvements (e.g. de-emphasized details, excluded irrelevant data, distinct and/or simplified geographic features, eliminates clutter, multiple routes for a destination, etc.) in comparison to an enhanced schematic destination map 106 related to a second destination.

The automatic schematic map generator 102 can receive data related to a destination, wherein such data can be, for instance, received from a user, a location on a map, an address, a street, an intersection, a store, a city, a county, a country, a building, any data related to a point on a map, etc. Moreover, the automatic schematic map generator 102 can automatically create the enhanced schematic destination map 106 utilizing geographic data surrounding the destination, wherein the geographic data can be any data related to the geography of, for instance, the world, a state, a city, a county, a region, and/or any suitable geographic data surrounding the destination. For example, the destination can be a user-specified location such as, a wedding reception hall at 1234 Main Street, Seattle, Wash. The automatic schematic map generator 102 can automatically create an enhanced schematic destination map 106 based at least in part upon the received destination, wherein the map can include various improvements such as: easy-to-read routes, de-emphasized details, excluded irrelevant data, distinct and/or simplified geographic features, eliminates clutter, easy-to-use, and/or multiple routes for a destination. It is to be appreciated that such improvements are in comparison to conventional literal destination maps, line drive maps, and/or any other traditional map.

Moreover, the automatic schematic map generator 102 can utilize at least one principle for automatically producing enhanced schematic destination maps 106. For instance, the principles can be, but are not limited to, 1) selectively filtering geographic data such that only relevant data can be included on the enhanced schematic destination map 106; 2) distorting geographical data to make the enhanced schematic destination map 106 easier to comprehend and use; and 3) decorating the enhanced schematic destination map 106 with additional information to improve usefulness such as road name labels, annotations, and destination addresses (e.g., discussed infra). In addition, the automatic schematic map generator 102 can implement various algorithms which reflect such techniques and/or principles, wherein such principles can reduce the time and skill to produce the enhanced schematic destination map 106.

The principles and/or techniques utilized by the automatic schematic map generator 102 facilitate automatically producing enhanced schematic destination map 106 which can be more useful for way-finding than both conventional maps and schematic route maps (e.g., line drive maps). The automatic schematic map generator 102 can reduce the amount of detail depicted in each map to just that which is necessary to travel to a destination and/or a set of destinations from the surrounding region (e.g., and back again). Moreover, the system 100 supports the map user with alternative routes and context and renders the selected detail to maximize map clarity and usefulness.

The automatically generated enhanced schematic destination map 106 can include a variety of easy-to-read routes to the destination, de-emphasizes and/or excludes irrelevant details, and distort and/or simplify many geographic features in order to make the map easier to read and use. The enhanced schematic destination map 106 highlights the location and context of one or more user-specified destinations, and shows multiple ways of reaching such destinations from the surrounding locale. Such enhanced maps 106 are automatically generated and can include only the geographic detail necessary to assist users reach destinations depicted, yet contain much more useful information than a conventional route map.

It is to be appreciated that the enhanced schematic destination maps 106 can be utilized for meetings, parties, and other events for which participants will be coming from a plurality of different directions but, for instance, the budget, prohibits investing in a conventional hand made map. In addition, the enhanced schematic destination map 106 can be utilized for personalized "multi route" maps which can depict several different routes and even several modes of transportation among destinations. Furthermore, the automatically generated enhanced schematic destination map 106 can be utilized for vacations, tours, and errands, which show a series of historical sites, hotels, shops, real estate, etc. with routes related thereto.

For instance, the enhanced schematic destination map can be a map surrounding a region around a destination, wherein the surrounding region can be populated with a route hierarchy. The route hierarchy can be based at least in part upon road size. For instance, the largest roads can be an interstate highway. Next, a medium-sized road can be utilized, wherein the medium-sized roads can be enclosed by the large roads (e.g. borders of a maximum region). The medium-sized roads can be arterials, state highways, and other major roads. Then, a local street can be utilized, wherein the local streets are included that are within the medium-sized roads.

Moreover, the system 100 can include any suitable and/or necessary interface component 104 (herein referred to as "interface 104"), which provides various adapters, connectors, channels, communication paths, etc. to integrate the automatic schematic map generator 102 into virtually any operating and/or database system(s). In addition, the interface 104 can provide various adapters, connectors, channels, communication paths, etc., that provide for interaction with the automatic schematic map generator 102, geographic data, a destination, a set of destinations, and/or any other data related to the system 100.

Figure 2:
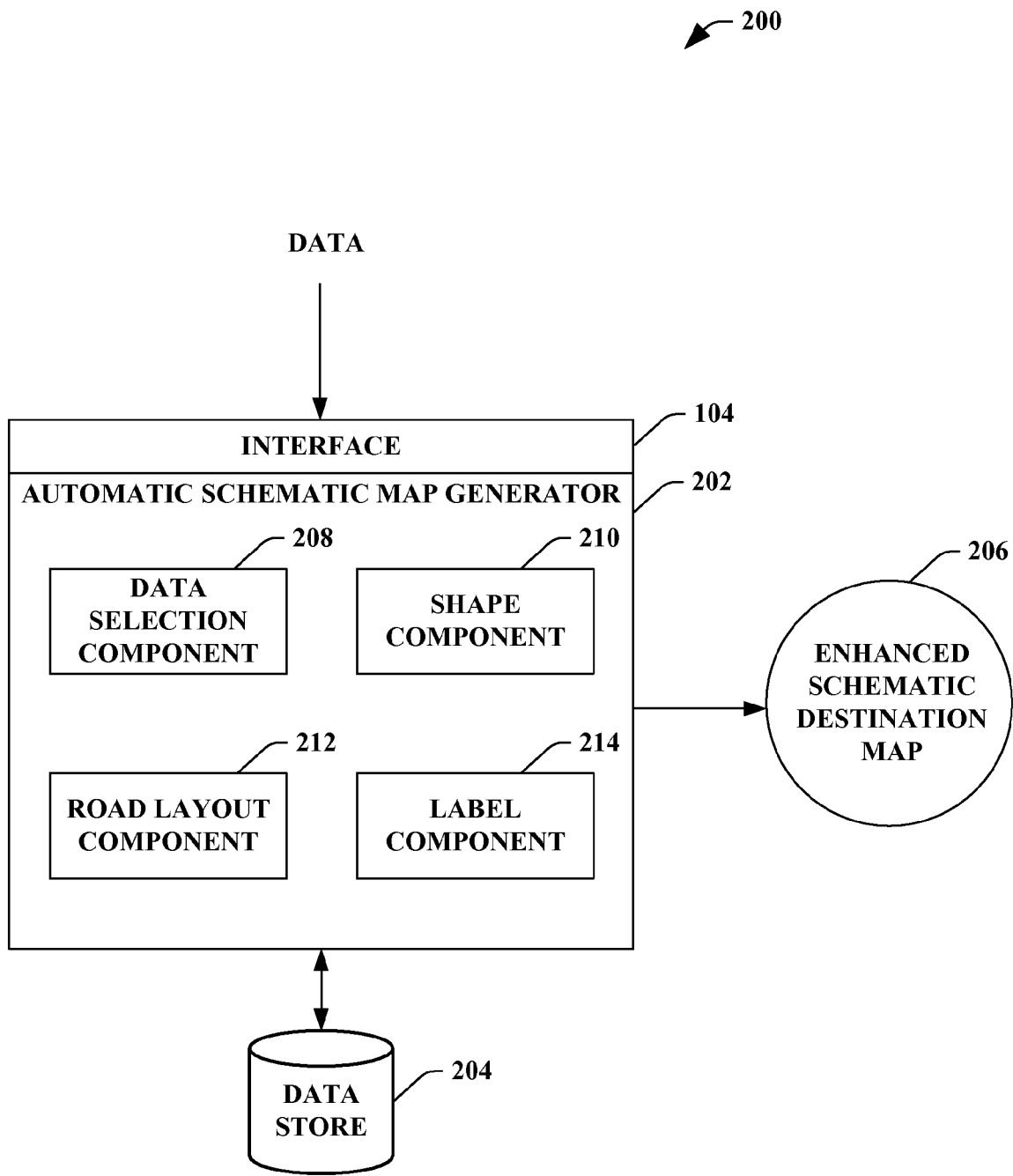
FIG. 2 illustrates a block diagram of an exemplary system that facilitates automatically generating an enhanced schematic destination map with at least two routes based at least in part upon a destination.

FIG. 2 illustrates a system 200 that facilitates automatically generating an enhanced schematic destination map with at least two routes based at least in part upon a destination. The system 200 includes an automatic schematic map generator 202 that automatically produces an enhanced schematic destination map 206 based at least in part upon a hierarchy of roads and a destination. For example, the automatic schematic map generator 202 can receive at least one destination from a user, wherein the respective enhanced schematic destination map 206 can be created utilizing geographic data. It is to be appreciated that the enhanced schematic destination maps 206 can include less detail and/or precision than a literal route map, yet still include enough enhanced features to allow a user to reach the destination from the hierarchy road set.

The automatic schematic map generator 202 can utilize a data store 204, wherein the data store 204 can store various data related to the system 200. The data store 204 can provide storage for geographic data such as, but not limited to, roads, streets, highways, interstates, bridges, buildings, parks, landmarks, bodies of water, rivers, intersections, tunnels, tolls, elevations, borders, boundaries, schools, fire departments, police departments, prisons, wildlife preserves, and/or any other data suitable for display on a geographic map, etc. The data store 204 can be, for example, either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, and the like.

The automatic schematic map generator 202 can include a data selection component 204 that utilizes a hierarchical selection criterion to ensure the road hierarchy is connected and includes multiple routes. Yet, it is to be appreciated that the enhanced schematic destination map 206 can include a single route when such destination has only a single route associated thereto. The data selection component 208 can filter the geographic data based upon a road hierarchy surrounding the destination. In other words, a hierarchy of road sets can be utilized to create at least one route to the destination. The road sets can be, for example, a large road set, a medium road set, and a local road set, wherein such sets can be based upon road size, speed limit, lanes within the road, etc. For instance, the large road set can include interstate highways; the medium road set can include arterials, state highways, and other major roads within the boundaries of the large road set; and the local road set can include local streets within the boundaries of the medium road set.

Figure 3:
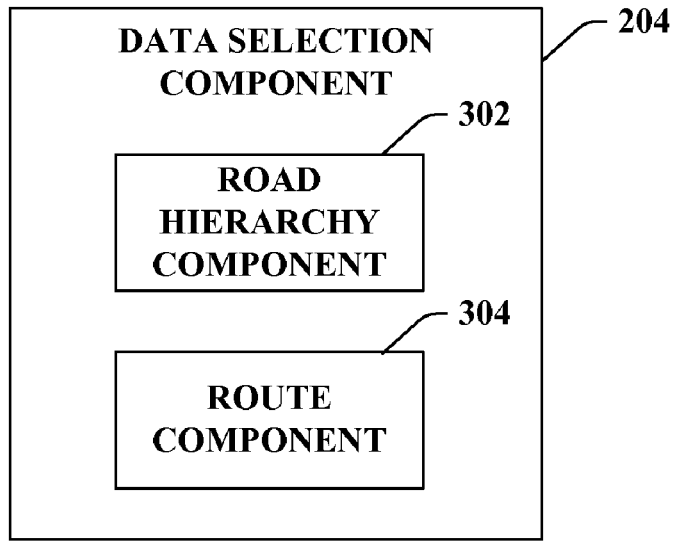
FIG. 3 illustrates a block diagram of an exemplary system that facilitates creating an enhanced schematic destination map of a destination.
Figure 3:
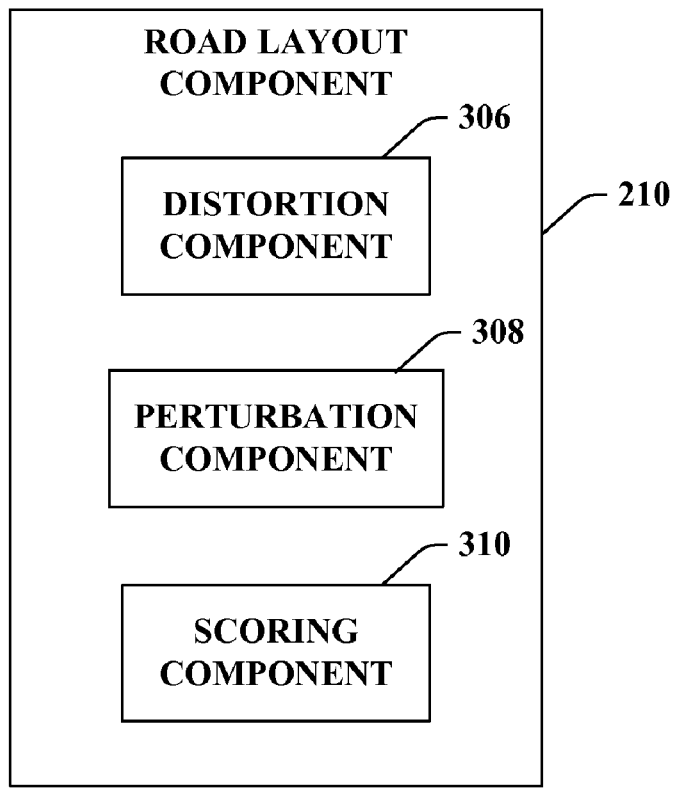
Figure 5:
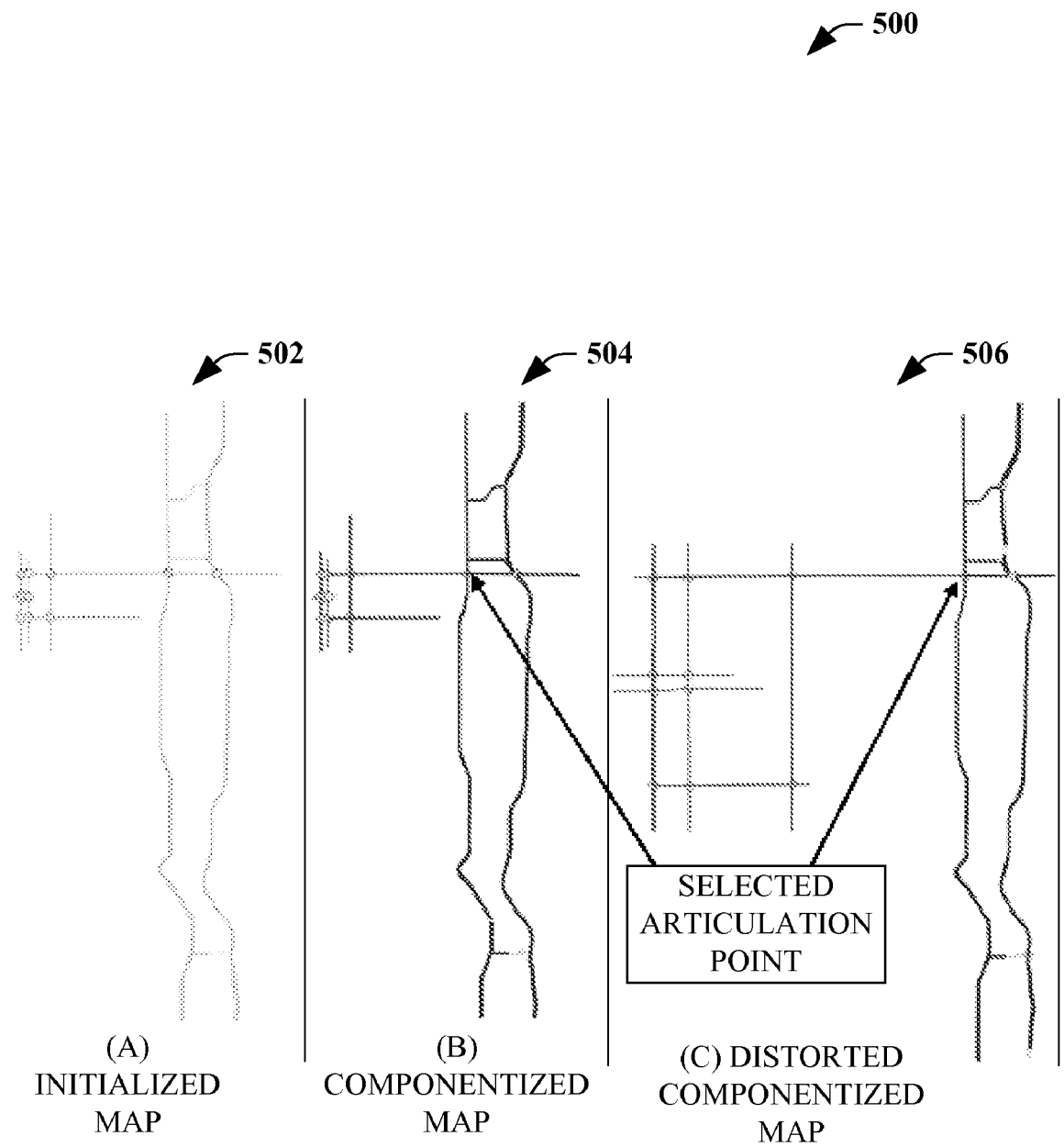
FIG. 5 illustrates a generation of a layout perturbation in accordance with an aspect of the subject innovation.

The automatic schematic map generator 202 can further include a shape component 210 that simplifies geometry associated with the roads and/or hierarchically selected geographic data from the data selection component 208. The shape component 210 can simplify the geometry of individual roads utilizing shape simplification. It is to be appreciated that the shape simplification can implement the substantially similar procedures, principles, and/or basic algorithm as outlined for shape simplification in the LineDrive system. Shape simplification can be more constrained in the shape component 210 by the fact that there more possibilities for the introduction of false intersections. The shape component 210 can address such false intersections in a SIGGRAPH timeframe by iterating optimizations. In other words, the shape component 210 performs shape simplification; then road layout; then doing another round of shape simplification; and so on and so forth The automatic schematic map generator 202 of system 200 can further include a road layout component 212. The road layout component 212 can structure the road layout as, for instance, a stochastic search. The search space consists of different possible 2D layouts of the road network data. The search can be conducted with a simulated annealing algorithm. The algorithm starts with an appropriately initialized copy of the road network. For example, see FIG. 5 at 502 (A) Initialized Map. During a respective iteration related to the algorithm, the layout of the road can be perturbed in a manner by the road layout component 212 (discussed in more detail in FIG. 3). The new layout can be evaluated based at least in part upon the perturbation. If the score of the layout goes down as a result of the perturbation, then the new layout is accepted as the input to the next iteration of the algorithm. If the score goes up as a result of the perturbation, then it is accepted with some probability, otherwise it can be rejected. The probability of accepting a worse layout is dependent on a temperature variable, which can go down in stages over time The automatic schematic map generator 202 can include a label component 214 that facilitates labeling roads associated with the enhanced schematic destination map 206. The label component 214 can implement an automated label placement technique. For instance, an annealing approach can be utilized, wherein such techniques allow clear and concise labels that do not interfere with each other and offer enhanced readability. For example, the label component 214 can provide labels for roads that do not interfere with respective readability such that placement, font, orientation, etc. can be manipulated. It is to be appreciated that the label component can iterate between labeling and distortion to various aspects of the enhanced schematic destination map 206. Thus, a new layover can be distorted even more so that a label can fit better. Then a second iteration of labeling can be employed after the distortion, to allow a further refinement of the labels. It is to be understood that any suitable number of iterations between labeling and distorting FIG. 3 illustrates a system 300 that facilitates creating an enhanced schematic destination map of a destination. The system 300 includes the data section component 204 as described in previous figures, wherein the data selection component 204 provides the hierarchical selection of geographic data associated with a particular destination. The data selection component 204 can utilize a hierarchical selection criterion to ensure the road hierarchy is connected and contains multiple routes.

Figure 4:
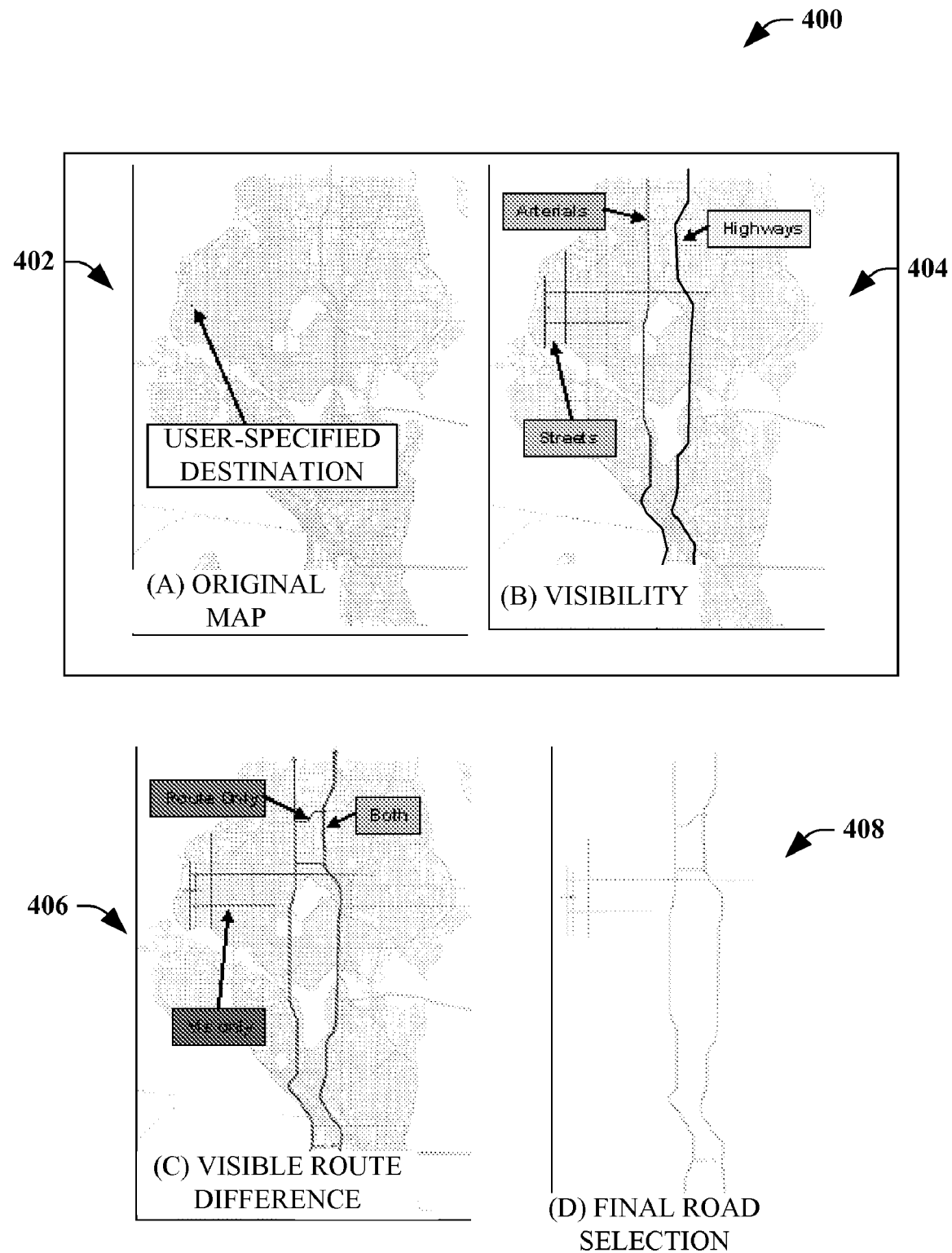
FIG. 4 illustrates phases related to selecting geographic data in accordance with an aspect of the claimed subject matter.

Once the user has specified a destination (e.g., See FIG. 4 at 402, where the destination can be seen at (A) Original Map), the data selection component 208 chooses which roads can be included in the enhanced schematic destination map 206. The hierarchical design criterion for road selection can be employed by utilizing a modified two dimensional (2D) geometric visibility algorithm to determine a set of "preferred" roads. The data selection component 208 performs three visibility passes as follows: In the first sweep, a determination related to which large highways are visible from the destination, as if all other roads in the map were invisible. Referring briefly to FIG. 4, at 404 these highways can be seen in (B) Visibility. Next, the data selection component 208 performs another sweep of mid-sized roads (e.g., arterials, other major roads) within the region enclosed by the large highways and/or the bounds of the maximum search region (whichever is smaller). Referring briefly to FIG. 4, at 404 these mid-sized roads can be seen in (B) Visibility. Finally, the data selection component 208 performs a sweep of only the local streets within the region enclosed by the mid-sized roads, the large highways, and the maximum search region (whichever is smaller). Referring briefly to FIG. 4, at 404 these local streets can be seen in (B) Visibility. It is to be appreciated that the maximum search region can be defined as everything that falls within a radius of a pre-defined limit, such as, for instance, 10 km from the destination.

The set of "preferred" roads compiled may not contain routes, nor even to be connected; therefore the data selection component 208 constructs routes which include preferred roads whenever possible. The data selection component 208 can utilize a series of modified A*-style route finding passes. The A* algorithm finds a single optimal route between an origin point and a destination point according to an optimality criterion (e.g., shortest route, fastest route, fewest turns, etc.). The algorithm can be modified to favor roads within the preferred set while searching for a shortest route and the set of large highway endpoints can be chosen as the set of route origins. The data selection component 208 can compute one route from each highway endpoint (e.g., where the highway intersects the border of the maximum search region) to the destination; and one route from the destination to each highway endpoint. Referring briefly to FIG. 4, at 406 the computation can be seen in (C) Visible Route Difference, where the relatively few roads which had to be added (e.g., route only) by the algorithm from the conventional map. The union of all roads identified with the visibility algorithm and the route finding algorithm constitute the full selection of roads for the enhanced schematic destination map 206. Turning briefly to FIG. 4, the full selection utilizing the hierarchy of road sets is illustrated at 408 under (D) Final Road Selection.

Maps which contain multiple destinations can be handled by the data selection component 208 with a straightforward generalization of the way in which maps containing a single destination are handled: First, a union of the visibility results for each individual destination is taken, and then the cross of all route combinations is found.

Once the data selection component 208 has determined a full set of roads to include in the enhanced schematic destination map 206, various data cleaning procedures can be performed to make such map easier to meet various map layout design principles. First, the data selection component 208 can identify all overpasses (e.g., places where one road passes over another road, but do not intersect). Next, a dynamic programming algorithm can be employed to merge chains of roads and determine which properties of the chain are most relevant. Finally, roads can be grouped which share an above-below relationship, and those that share a side-by-side relationship, so that such roads can be distorted together (discussed infra).

The data selection component 204 can include a road hierarchy component 302 to facilitate choosing roads based upon a hierarchy. The road hierarchy component 302 employs the hierarchy of road sets described above to follow the hierarchical design criterion: By providing a hierarchical structure upfront, the road hierarchy component can be commensurately easier to use. The road hierarchy component 302 can choose roads hierarchically with respect to the destination(s). Based on cartographers, the largest roads (e.g., interstate highways) in the region surrounding a destination can be generally recognized as landmarks and can be located by people who are only slightly familiar with the area. The road component 302 chooses the largest roads first, with the reasoning that if the map user can find one of the large roads on without assistance, then the map user can get from there to the destination(s) using the enhanced schematic destination map. The road hierarchy component 302 can choose a set of medium-sized roads from within the region enclosed by the large roads (and/or the borders of a maximum region). These include arterials, state highways, and other major roads. The road hierarchy component 302 can also choose local streets surrounding the destination(s) from within the region formed by the medium-sized roads (and/or the maximum region).

It is to be appreciated that the road hierarchy component 302 can utilize any suitable road selection technique. For instance, a visibility operator can be utilized to find at least one visible road within a class (e.g., size, etc.). The classes of the visible roads can then be used such that the streets and the arterials can be included in the enhanced schematic map (e.g., regardless if used with a route). The edges of the largest class of visible roads can be employed regardless if the largest class of roads is not large roads (highways, major roads, etc.). Moreover, source plates can be chosen from a sub-graph (e.g., connected part of the road). In other words, visibility identifies visible edges and the edges belong to sub-graphs and those sub-graphs include roads. The edges can be picked from the largest road class and figure out a sub-graph, take the extremity points of the sub-graph to make them the source points for capillary routes to and from the destination. The road hierarchy component 302 can further identify a particular road/route (e.g., a bleeding technique) of the sub-graph to which the visible edge belongs that is to be followed and/or partial to in comparison to other roads/routes for the purpose of finding routes from the source points to the destinations (also referred to as "to routes"). The road hierarchy component 302 can utilize the set of largest roads in the graph and a set of routes (to routes) to calculate a "from route," routes from the destination to the sub-graph source points. The "from route" favors not only the largest routes from visibility but also the "to routes" to allows the largest roads to be favored. This technique can cut down the amount of independent routes in the map (e.g. further simplifies the routes). The "to routes" and the "from routes" can be combined with the streets and arterials that are identified from visibility, and then from the edges collected, the largest connecting component which is associated with all of the destinations and that can be the road collection/selection.

The data selection component 204 can further include a route component 304. The data selection component 204 establishes a set of "preferred" roads in the map which reflect three desirable goals that can be implemented by the route component 304: First, the map can describe efficient access to/from a large region from/to the destinations, which can make the map more flexible and useful to a wider range of users. Second, the preferred roads can be easy to use in and of themselves, which can be an important criterion for cartographers. And third, routes which are biased to incorporate the set of preferred roads can keep map users on the largest possible roads for the longest possible amount of time, which result in easy-to-follow routes with relatively few turns (another important goal for cartographers).

The route component 304 can explicitly design routes, employing roads from the preferred set whenever possible, and supplementing from the literal map when not. The route component 304 can implement a primary design goal for route finding, wherein the primary design can be to establish multiple routes which describe at least one way to get to/from each destination from/to both sides of all the largest roads. In this way, the route component 304 can provide alternatives from which the map user can choose in a dynamic manner, depending on current conditions (e.g., traffic, construction, etc.), where the map user can be coming from, and whether the map user gets lost.

The system 300 further includes the road layout component 210. The road layout component 210 can include a distortion component 306. The distortion component 306 can render the hierarchically selected geographic data to maximize clarity and usefulness. As with road selection, the schematic destination map layout can be designed with an eye toward the unique characteristics of human spatial perception and memory. There is ample evidence to suggest, for instance, that we naturally introduce geometric distortions in our memory of space. This can occur automatically in an attempt to fit perceptions to preconceived models which are simpler to comprehend and easier to remember. From this perspective, some map features are more important than others: Less important features can safely be altered without affecting the usefulness of the map, while more important features should be preserved and/or emphasized to increase usability.

Mapmakers have recognized this for centuries, and cartographic and cognitive research has suggested an ordering for how important various aspects of map depiction are for map usefulness: For example, at the top can be existence and connectedness of map features. Next can be orientation of the whole map and of individual features. After that can be localization of map features with respect to one another. Finally, distance between features and shape of features can be of lesser importance, as are often distorted even in conventional maps.

Within this framework, the distortion component 306 can have two main map layout goals—1) to make sure that all roads in the final map are visible; and 2) that the original road network topology is maintained. To a lesser extent the distortion component 306 can also maintain an overall correspondence of the map to users' mental models of reality and common knowledge-making it easier to use as a planning device, especially for those who are familiar with the area depicted by it; and it will make it easier to use the map as a memory aide, especially for those who are unfamiliar with the area before they subsequently travel through it.

The distortion component 306 can address a more general case of distorting graphs that contain loops. The distortion component 306 can meet psychologically meaningful distortion goals by optimizing across a set of soft constraints, and it can produce reasonable results even if some of those constraints are not fully met. Below is a description of each set of soft constraints that can be satisfied performing map distortion by the distortion component 306.

The distortion component 306 can maintain the basic topology of the map's road network, including the set of intersections that occur and the relative ordering of roads at intersections. Introducing new intersections that do not exist in reality (e.g., false intersections) would result in a topologically inaccurate map which includes routes which do not actually exist. Failing to represent intersections where such intersections actually occur in the topology (e.g. missing intersections) can be generally lower-risk. However, it is also undesirable, since the road network that is chosen by our road selection algorithm is chosen in part based on the routes it contains, and omitting an intersection is equivalent to deleting one or more routes from the network.

In addition, the distortion component 306 can maintain the turn direction. At each intersection, the turn directions between all pairs of incident roads can be maintained. A right turn from one road to another can remain a right turn; a left turn can remain a left turn. Changing the turn direction between any pair of roads could significantly confuse a map user, lead to route planning mistakes, and cause the user to get lost while following the map.

The distortion component 306 can also provide accurate depiction in relation to turns. In general, people need to make decisions about what to do at each turning point as they are navigating a route; therefore accurate depiction of turning points is extremely important. In fact, several studies have concluded that it is particularly important to concentrate information around decision points (e.g., such as turns) to support user activity there.

For instance, it is important that the distortion component 306 maintain turn angles (e.g. the relative angles of road segments when met at an intersection) as much as possible, at least within the three "zones" identified by Gestalt psychology: acute, right, and obtuse. That is, acute angles should remain acute, right angles should remain approximately right, and obtuse angles should remain obtuse. Failure to do so could confuse the user when they are actually following the map. It can also make it more difficult for the user to associate the details of the map with mental images of the turns and roads depicted in within, which would violate the goal of maintaining a basic correspondence between the map and reality. There is some cognitive evidence to suggest that users generally normalize most turns in memory to right angles, therefore it can maintain acuteness and obtuseness for the most extreme examples.

A related goal can be that a road which continues straight through an intersection should be kept straight at that intersection by the distortion component 306. Akin to the situation for turn angles, there are three significant "zones" for a road passing through an intersection: Veer to the left, straight, and veer to the right. For instance, when the user is approaching an intersection, the map can reflect a perception of what the road does as it continues (e.g., in reality) beyond the intersection (e.g., does it veer off to the left, veer to the right, or does it go straight?). If the road veers to the left in reality, but it is depicted as veering to the right on the map, this can confuse the user and reduce the map's usefulness as a navigational aid.

The distortion component 306 can further maintain the road geometry. Some aspects of road geometry can be maintained, while others can be altered to improve clarity and readability of the map. It is important, for instance, that the distortion component 306 maintains the relative ordering of lengths of roads (e.g., if a road A between a pair of intersections is actually longer than another road B between another pair of intersections, then A should also appear longer than B in the distorted map). It is to be appreciated that the relative ordering of lengths matters, and not the actual ratio of one length to the other. In addition, also note that this can apply to roads that run between intersections with other roads, and not to "tail" roads that trail off (e.g., for instance toward the boundaries of the map).

Maintaining the relative ordering of lengths of edges can be important because it provides a basic bit of information the user can use to make decisions about what routes to take through the map. It may not be important that the user see the literal lengths of routes in order to make an informed decision about which route to take, only that they see that one route is longer than another. If the distortion component 306 places relative lengths of roads too far out of order, especially among roads of a similar class, it can contradict the user's perceptions as the map is followed, thus making the map more confusing and harder to follow. Altering the order of relative lengths can not in general, however, render the map unusable in the same way that altering the map topology would.

The distortion component 306 can adapt road lengths to represent the amount of time required to traverse the segment since time is often more important than distance to a user driving in a car. A one mile segment of interstate highway would thus be represented as much shorter than a one mile segment of city street (e.g., because it has a higher speed limit and it takes less time to traverse it at higher speed). In other words, this might be the relative ordering of lengths the distortion component 306 can maintain, in addition to the relative ordering of the literal lengths.

Another important aspect of road geometry that can be maintained by the distortion component 306 can be the relationships shared by some distinct roads. For instance, some roads—such as the separate directions of a divided highway or of a boulevard—share a "side-by-side" relationship with one another. Others share an "above-below" relationship. These relationships can be maintained in order to meet informed users' expectations and uniformed users' preconceived models. Failing to do so can contradict a familiar user's memory of the area depicted in the map. More so, even if a map user is unfamiliar with the area, it can be surprising and perhaps confusing to see an area illustrated by a map which depicts the two sides of a divided highway lying very far apart, or at different angles with respect to one another, instead of the correct relative geometric relationship.

In addition, the distortion component 306 can maintain road orientation. Each road can maintain as much as possible its predominant orientation with respect to, for example, the North direction. If road orientation varies significantly (e.g., from predominantly north-south to predominantly east-west), such variance can contradict a user's understanding of the region and make it harder to match details of the map to real geographical characteristics. With this in mind, however, there can be significant evidence from cognitive psychology which indicates that humans tend to rotate figures in a map toward the major axes. As a result, while it is important to maintain the predominant orientation, it is less important to maintain the exact orientation for the distortion component 306.

Finally, the distortion component 306 can loosely maintain exact road length and shape. People can follow a road once on it until the next turning point is reached without thinking much about the length and geometry of the road followed. Thus, depiction of exact length and shape may not be as important to the distortion component 306. In this light, deliberate road shape simplification can, in fact, improve map clarity and readability.

Continuing with FIG. 3, the road layout component 210 can include a perturbation component 308. The perturbation component 308 can facilitate distorting a general road network (e.g., a graph containing loops) by generating random layout perturbations. Perturbations which do not in some sense reflect the structural constraints imposed on the layout process with design principles can inevitably generate lots of unacceptable layouts. On the other hand, perturbations which are too constrained can easily cause the search to get trapped in valleys and in poor local minima. The perturbation component 308 can utilize various perturbations to achieve above described principles.

For instance, the perturbation component 308 can implement a first style of perturb referred to as "articulation point-based scaling." In graph theory, an articulation point is a vertex in a connected graph which, if removed, can separate the graph into two or more independent connected components. In a road network, this corresponds to an intersection that, if it were removed, can separate the network into two or more distinct maps. Our perturbation component 308 can include the following steps: Select an articulation point in the road network at random; decompose the network about that point; choose one of the resulting components at random; scale the chosen component about the chosen point by a random scale factor; and center scale the entire map back to a pre-specified bounding box. For instance, refer to FIG. 5, at 502, 504, and 506 respectively. The articulation point-based scaling perturb can reflect the structural constraints of road layout. The perturbation can never result in missing intersections, it will never change turn angles, and it can always maintain road orientation.

The road layout component 210 can further include a scoring component 310. Each time a new road layout is generated by the perturbation implemented by the perturbation component 308, the scoring component 310 can evaluate such layout according to the map distortion design principles outlined and discussed above. In particular, the scoring component can utilize the following aspects: First, determine if any new false intersections have been introduced, and if any true intersections are missing. These are among the most egregious errors that can be introduced by a perturbation, since they effectively alter the topology of the original (conventional) map. If any such errors are discovered, the new layout can given a very bad score. Next, determine if any roads in the new map fall below a minimum length threshold, below which it is difficult for a user to see them in the layout. The overall goal of distorting the road network can be to make every road in the map visible, thus if any are determined to be effectively invisible, the layout can be penalized accordingly. Finally, determine whether the relative lengths of roads in the map have fallen out of order as a result of the perturbation. Changes in relative ordering may not be counted until noticeable, and then can be penalized according to the size of the change.

Figure 6:
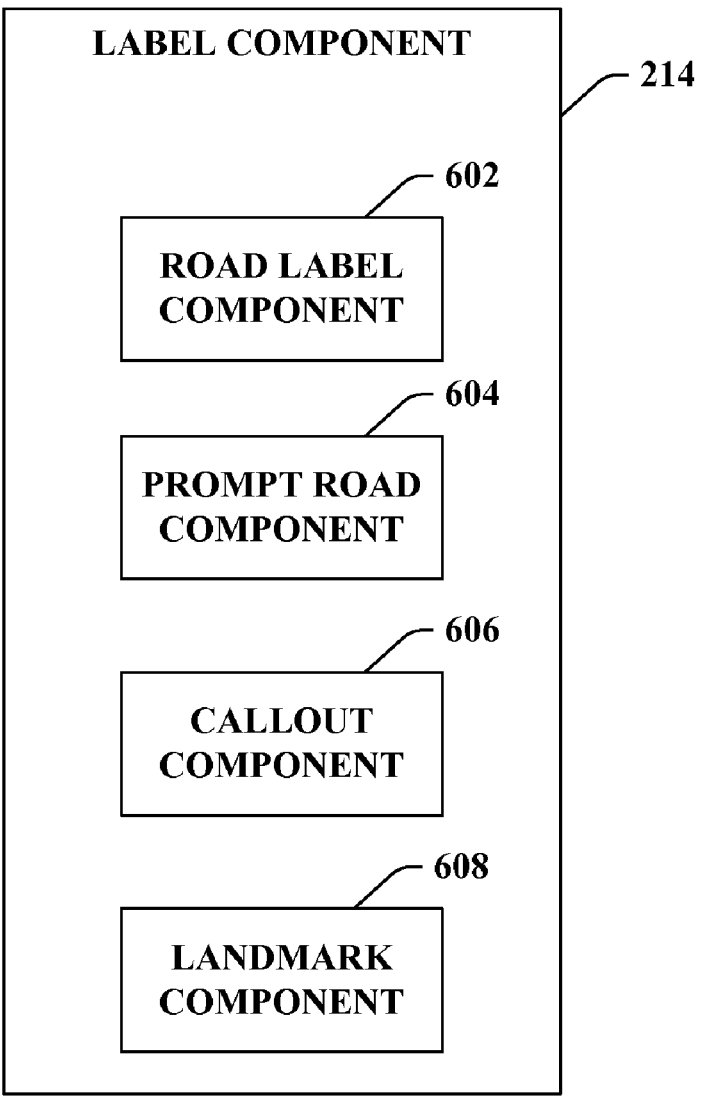
FIG. 6 illustrates a block diagram of an exemplary system that facilitates automatically generating an enhanced schematic destination map with at least two routes based at least in part upon a destination.

FIG. 6 illustrates a system 600 that facilitates automatically generating an enhanced schematic destination map with at least two routes based at least in part upon a destination. The label component 214 can facilitate labeling roads associated with the enhanced schematic destination map. The label component 214 can implement an automated label placement technique. For instance, an annealing approach can be utilized, wherein such techniques allow clear and concise labels that do not interfere with each other and offer enhanced readability. In addition, the label component 214 can decorate the map with labels and other information which can tell a map user the important properties each of the map features.

Figure 7:
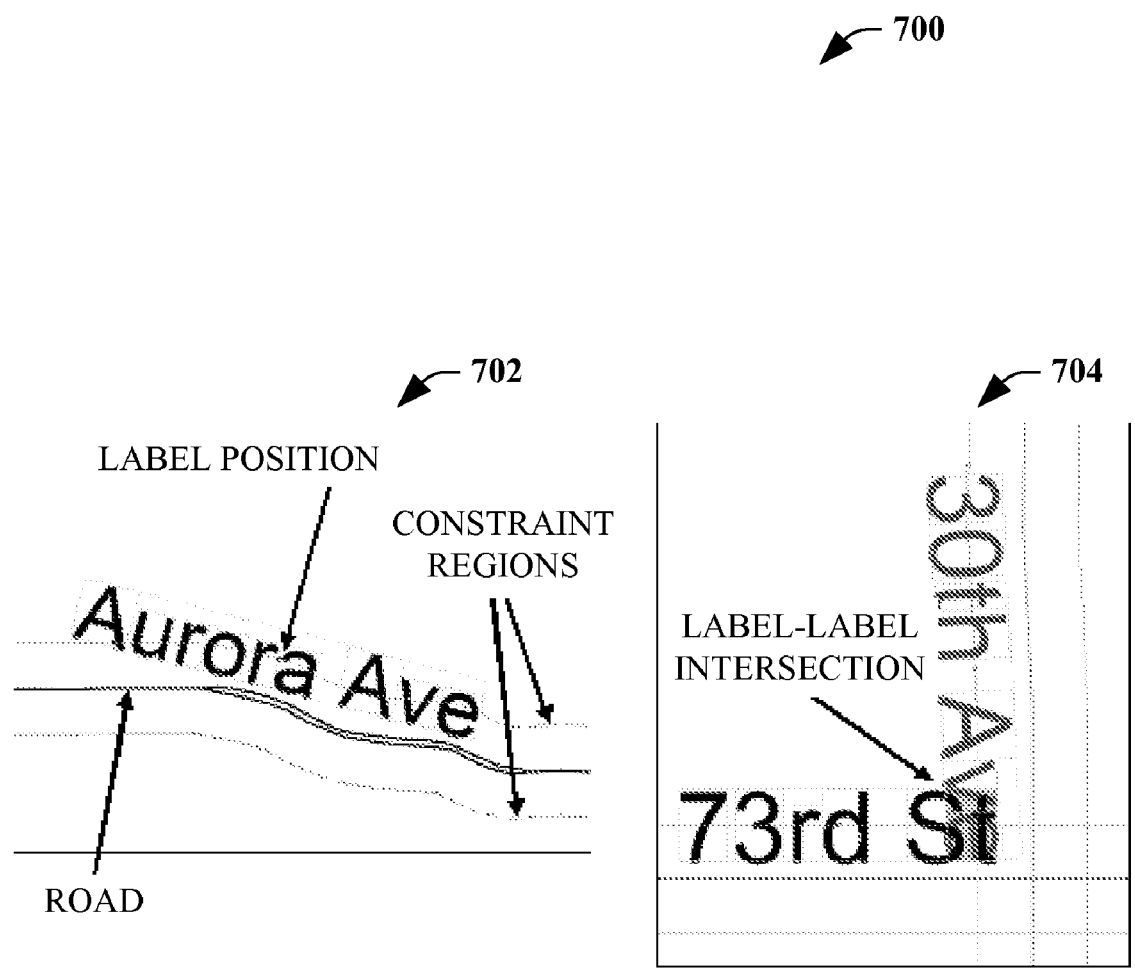
FIG. 7 illustrates a label layout related to an automatically generated enhanced schematic destination map in accordance with the claimed subject matter.

Referring briefly to FIG. 7, an illustrated label 702 depicts a concise visual statement of the label layout problem. For example, the label for a road can be constrained to be positioned somewhere "along" the road, either above or below it, and tilted to the tangent of curve of the road at the label position. An illustrated label 704, one of the worst things that can happen can be illustrated as a result of perturbing label positions, which is a label-label collision. It is to be appreciated that the label component 214 can prevent the instance of such problems and can optimize the label layout for a particular enhanced schematic destination map.

Turning back to FIG. 6, the label component 214 can include a road label component 602. The road label component 602 can focus on the following traditional goals in creating clear and useful label layouts. First, the road label component 602 can avoid label-label collisions. These can occur especially if two roads intersect, and such collisions can significantly reduce the readability of the labels involved. Second, the road label component 602 can avoid label-road collisions. This kind of collision can make it confusing to read the label involved, and it can obscure important map details. Finally, the road label component 602 can attempt to maximize the distance between labels so the appearance is evenly distributed across the underlying road network. This helps boost map clarity and readability.

Furthermore, the road label component 602 can implement an additional design consideration that can be to only display relevant properties for each map feature. The purpose of the enhanced schematic destination maps can be to show a user how to get to (and from) a destination (or set of destinations), therefore it is only information which is relevant to this purpose that can be displayed, and all other information can be hidden to decrease clutter. For instance, as a consequence of road selection, it is possible that a chain of roads (e.g., one leading to another, and so on, with no other intersecting roads) may appear in a map, where there are only slight differences between the roads in the chain ("$65^{th}$ NW" vs. "$65^{th}$ N", for example). Instead of labeling each individual road in the chain, the road label component 602 can include the most relevant properties, for instance the name of the road at the start of the chain and the name of the road at the end of the chain. Since these are the only points at which a user can turn onto the chain in our map, these are the most important names to include, and all of the others can safely be hidden to reduce clutter without sacrificing map usability.

Figure 8:
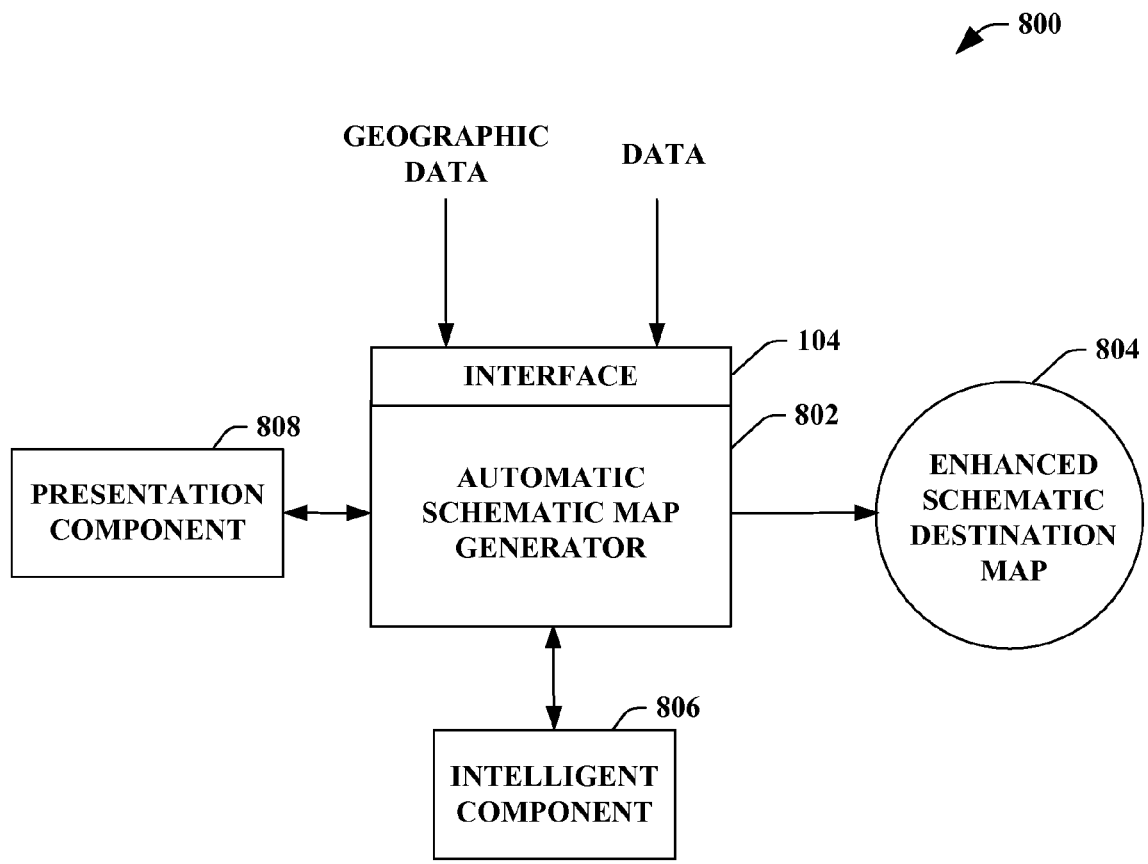
FIG. 8 illustrates a block diagram of an exemplary system that facilitates automatically generating an enhanced schematic destination map.

FIG. 8 illustrates a system 800 that employs intelligence to facilitate automatically generating an enhanced schematic destination map. The system 800 can include an automatic schematic map generator 802, the interface 104, an enhanced schematic destination map 804, data, and geographic data that can all be substantially similar to respective components, generators, maps, and data described in previous figures. The system 800 further includes an intelligent component 806. The intelligent component 806 can be utilized by the automatic schematic map generator 802 to facilitate automatically creating the enhanced schematic destination map 804 based upon geographic data and a destination. For example, the intelligent component 806 can infer destinations, route efficiency, traffic, construction, optimized traveling, personalized preferences associated with the enhanced schematic destination map 804, etc.

It is to be understood that the intelligent component 806 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 808 can provide various types of user interfaces to facilitate interaction between a user and any component coupled to the automatic schematic map generator 802. As depicted, the presentation component 808 is a separate entity that can be utilized with the automatic schematic map generator 802. However, it is to be appreciated that the presentation component 808 and/or similar view components can be incorporated into the automatic schematic map generator 802 and/or a stand-alone unit. The presentation component 808 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated with the automatic schematic map generator 802.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 9:
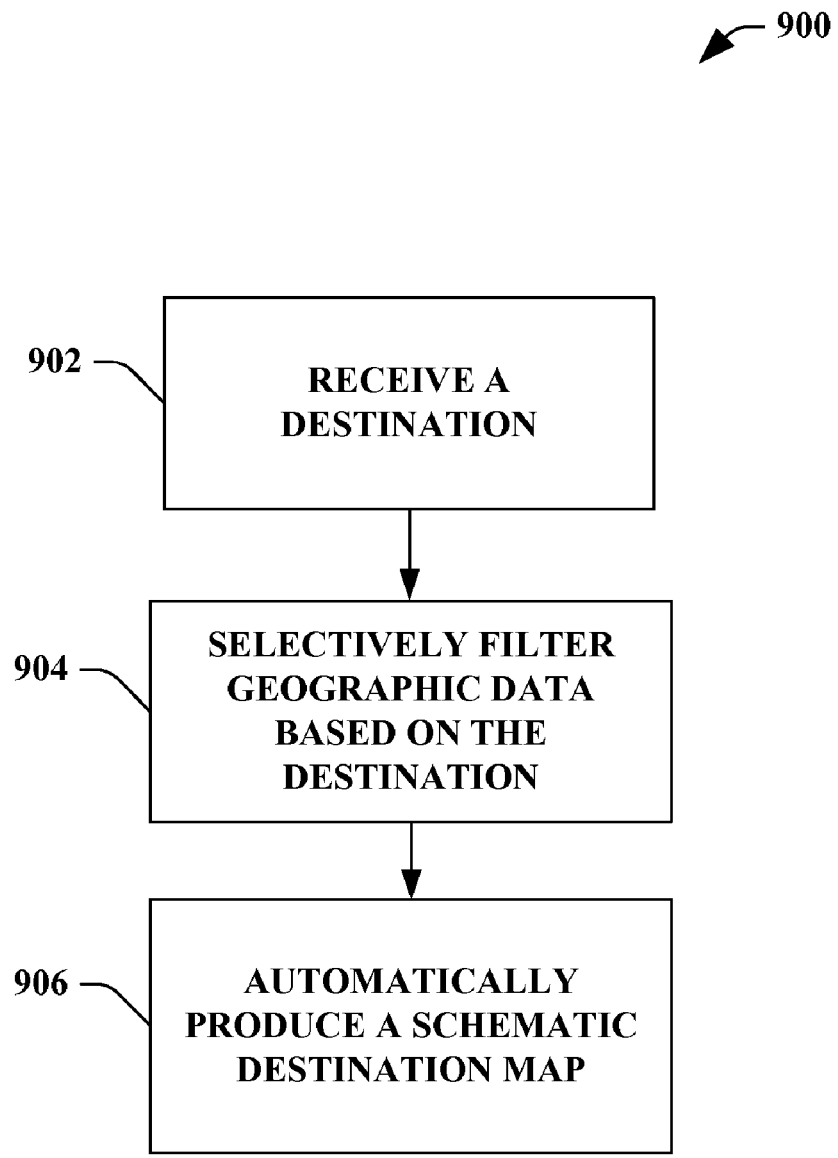
FIG. 9 illustrates an exemplary methodology that facilitates creating an enhanced schematic destination map of a destination.
Figure 10:
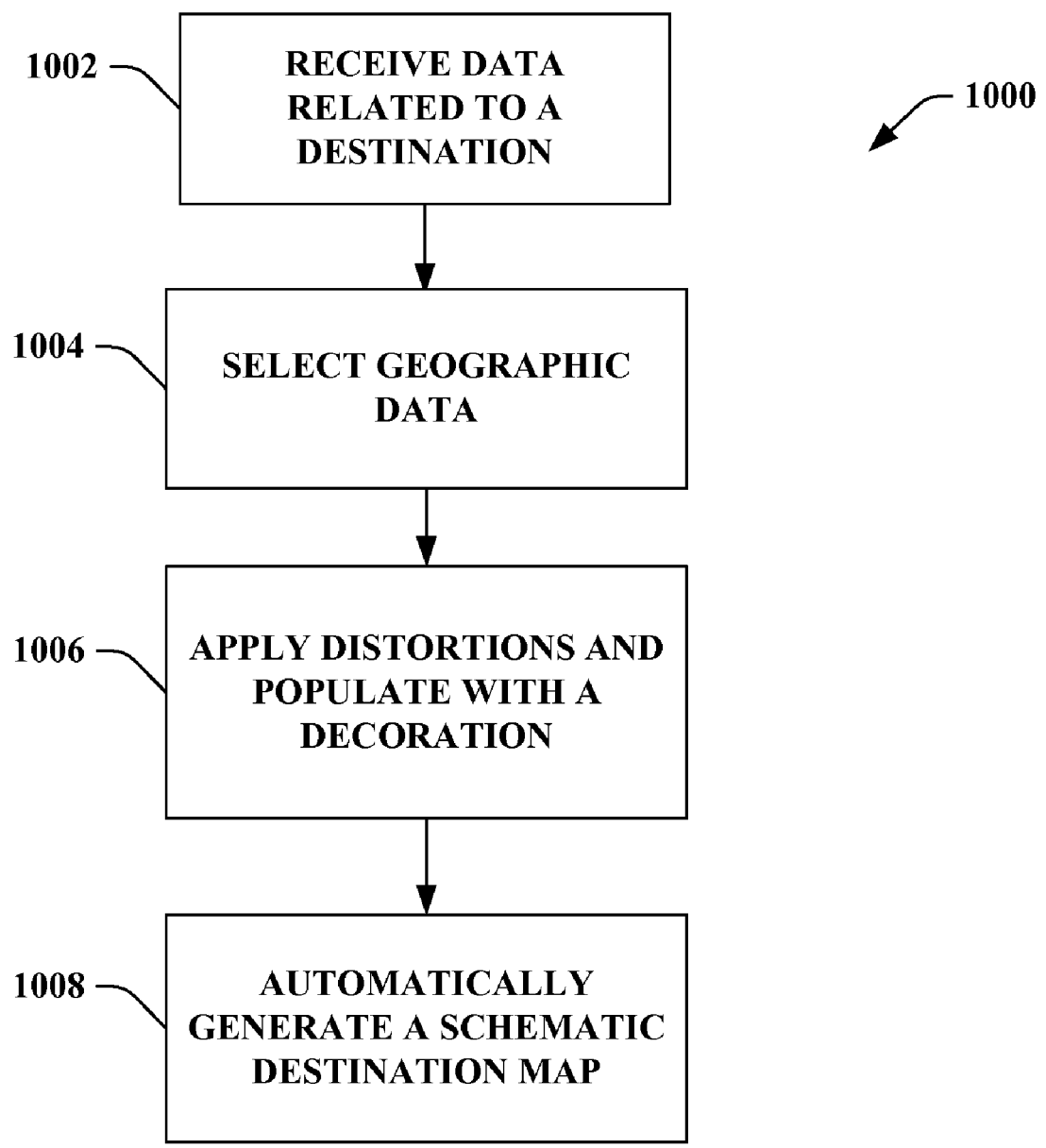
FIG. 10 illustrates an exemplary methodology for automatically generating an enhanced schematic destination map with at least two routes based at least in part upon a destination.

FIGS. 9-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 illustrates a methodology 900 that facilitates creating an enhanced schematic destination map of a destination. At reference numeral 902, a destination can be received. The destination can be, for instance, a location on a map, an address, a street, an intersection, a store, a city, a building, a state, country, a longitude and latitude, etc. Furthermore, the destination can be received from a user. It is to be appreciated that the methodology 900 can receive a plurality of destinations.

At reference numeral 904, the geographic data can be selectively filtered based at least in part upon the destination. The data can be hierarchically filtered to filter the appropriate routes to the destination. The data can be selected based at least in part upon a road hierarchy. For instance, a hierarchical selection criterion can ensure the road hierarchy is connected and includes multiple routes. In other words, a hierarchy of road sets can be utilized to create at least one route to the destination. The road sets can be, for example, a large road set, a medium road set, and a local road set, wherein such sets can be based upon road size, speed limit, lanes within the road, etc. For instance, the large road set can include interstate highways; the medium road set can include arterials, state highways, and other major roads within the boundaries of the large road set; and the local road set can include local streets within the boundaries of the medium road set.

At reference numeral 906, an enhanced schematic destination map can be automatically produced. The enhanced schematic destination map can be a stream-lined map that includes at least one of the following improvements: easy-to-read routes, de-emphasized details, excluded irrelevant data, distinct and/or simplified geographic features, eliminates clutter, easy-to-use, and/or multiple routes for a destination. It is to be appreciated that the enhanced schematic destination map can be stream-lined based at least in part upon an evaluation of geographic data surrounding the destination. In other words, an enhanced schematic destination map related to a first destination can include disparate improvements (e.g., de-emphasized details, excluded irrelevant data, distinct and/or simplified geographic features, eliminates clutter, multiple routes for a destination, etc.) in comparison to an enhanced schematic destination map 106 related to a second destination.

Moreover, the enhanced schematic destination map can be automatically produced by utilizing at least one principle and/or technique. For instance, the principles and/or techniques can be, but are not limited to, 1) selectively filtering geographic data such that only relevant data can be included on the enhanced schematic destination map 106; 2) distorting geographical data to make the enhanced schematic destination map 106 easier to comprehend and use; and 3) decorating the enhanced schematic destination map with additional information to improve usefulness such as road name labels, annotations, and destination addresses (e.g., discussed infra). In addition, various algorithms can be implemented which reflect such techniques and/or principles, wherein such principles can reduce the time and skill to produce the enhanced schematic destination map.

FIG. 10 illustrates a methodology 1000 for automatically generating an enhanced schematic destination map with at least two routes based at least in part upon a destination. At reference numeral 1002, data can be received related to a destination. The destination can be, for instance, a location on a map, an address, a street, an intersection, a store, a city, a building, a state, country, a longitude and latitude, etc. Furthermore, the destination can be received from a user, a software program, and/or any other suitable machine with the appropriate data.

At reference numeral 1004, geographic data can be selected. The geographic data can be selected based at least in part upon the destination location and a road hierarchy. The road hierarchy can utilize a set of roads, wherein the roads surrounding the destination can be grouped based on various characteristics. In other words, a hierarchy of road sets can be utilized to create at least one route to the destination. The road sets can be, for example, a large road set, a medium road set, and a local road set, wherein such sets can be based upon road size, speed limit, lanes within the road, etc. For instance, the large road set can include interstate highways; the medium road set can include arterials, state highways, and other major roads within the boundaries of the large road set; and the local road set can include local streets within the boundaries of the medium road set.

Continuing with reference numeral 1006, distortions can be applied and decorations can be populated. The distortion can render the hierarchically selected geographic data to maximize clarity and usefulness. Moreover, the distortion applied can utilize soft constraints in relation to topology, turns, and road geometry (all discussed above). The decorations can be applied such that that map can be populated with labels and other information which tell users the important properties of each of the map features. For example, the following can be populated: road name labels; prompt roads; callouts; landmarks; personalized data, etc. At reference numeral 1008, the enhanced schematic destination map can be automatically created, wherein the enhanced schematic destination map provides at least one of the following improvements: easy-to-read routes, de-emphasized details, excluded irrelevant data, distinct and/or simplified geographic features, eliminates clutter, easy-to-use, and/or multiple routes for a destination. In addition, the enhanced schematic destination map can be rendered and/or displayed to a user.

Figure 11:
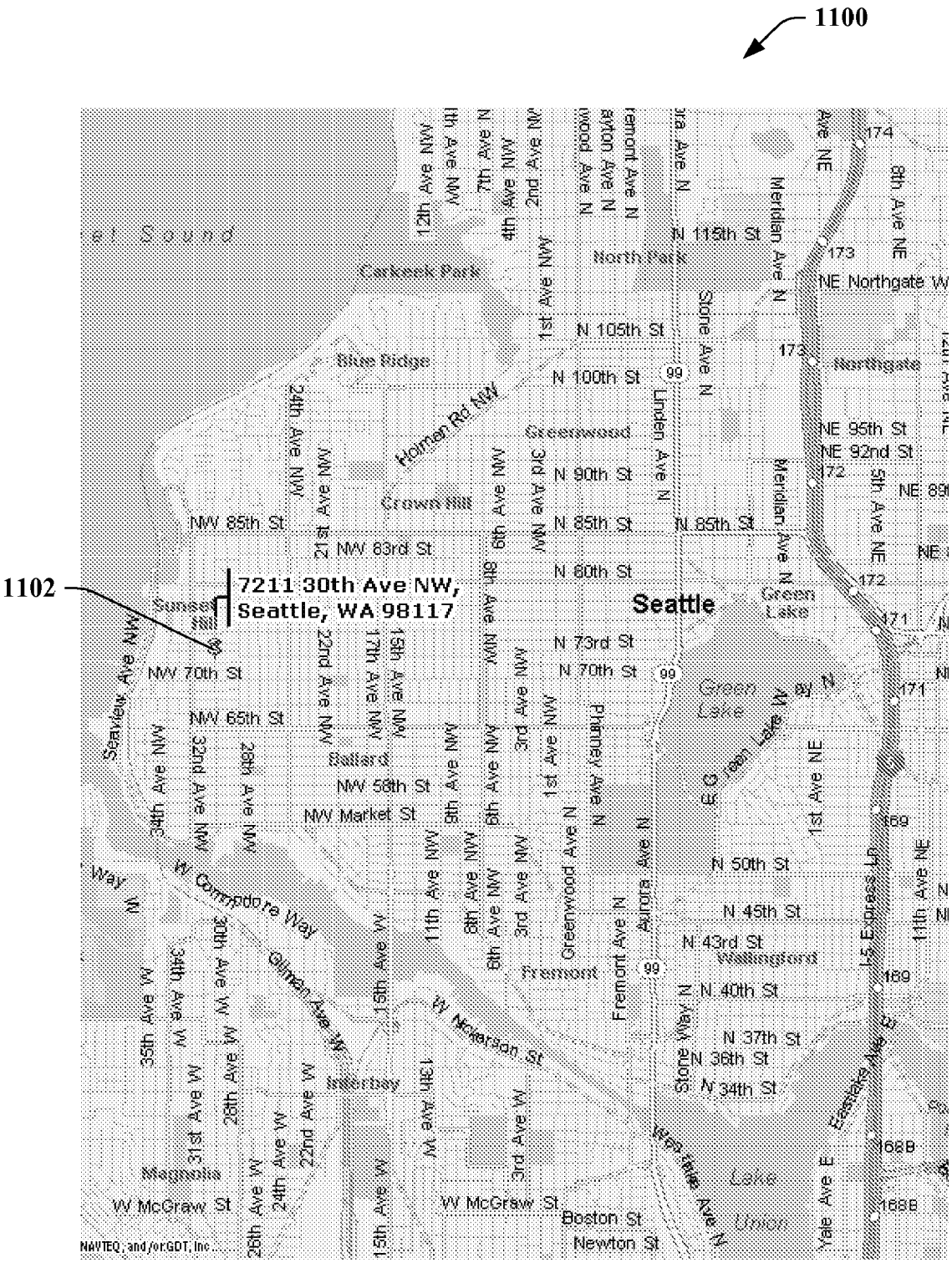
FIG. 11 illustrates an exemplary geographic data with a destination in accordance with the subject innovation.

FIG. 11 illustrates geographic data 1100 with a destination utilized in accordance with the subject innovation. The geographic data 1100 is an example of the conventional clutter-filled literal maps. The geographic data 1100 can be by an automatic schematic map generator (discussed above) to automatically produce an enhanced schematic destination map. A destination 1102 can be utilized, wherein the enhanced schematic map can be provided associated thereto. It is to be appreciated that multiple destinations can be associated with the geographic data 1100 and that the destination 1102 is solely for example.

Figure 12:
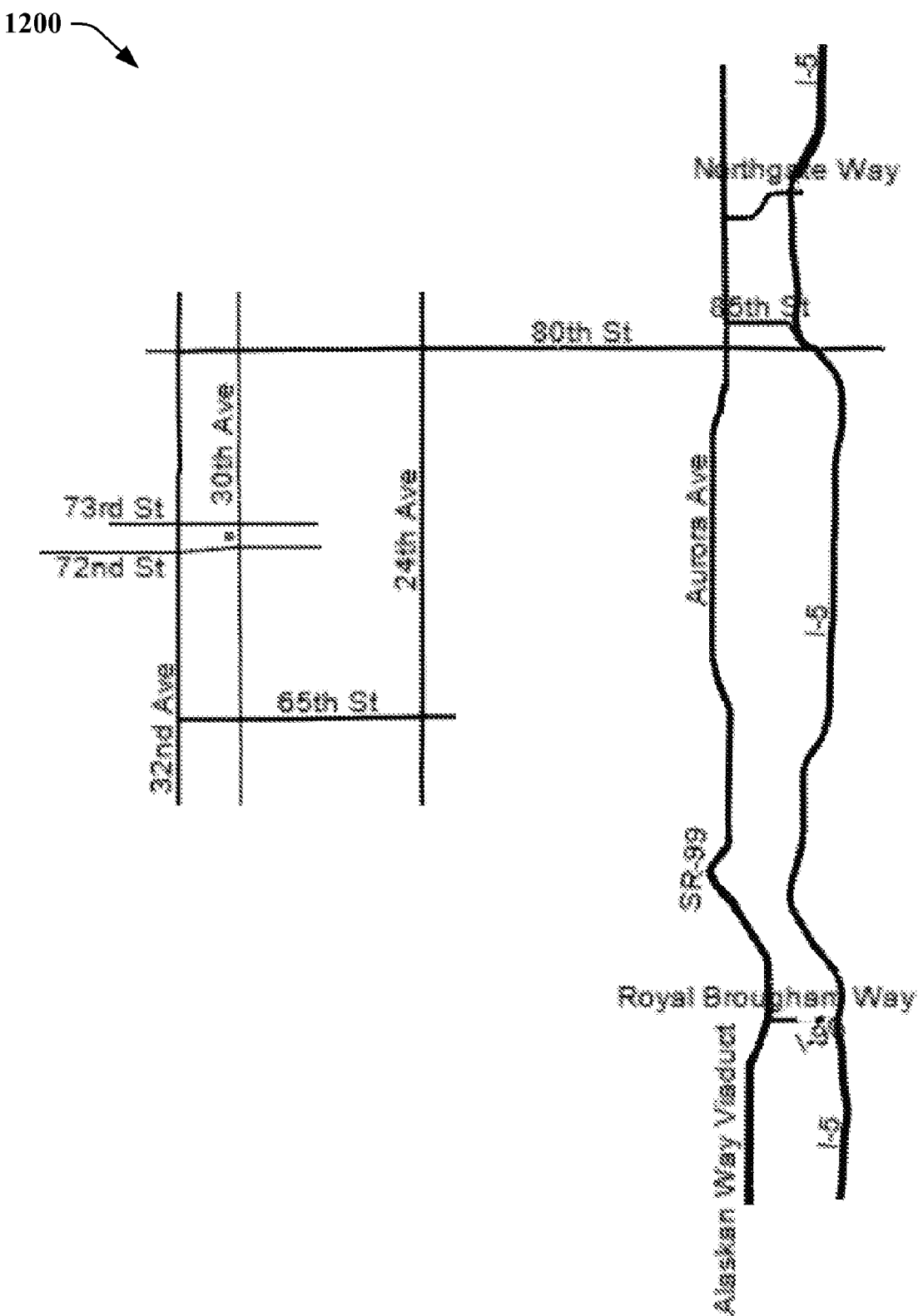
FIG. 12 illustrates an enhanced schematic destination map automatically generated for a destination.

FIG. 12 illustrates an enhanced schematic destination map 1200 automatically generated for a destination. An enhanced schematic destination map 1100 is illustrated associated with the destination 1102 in FIG. 11. The enhanced schematic destination map 1200 is a stream-lined map that includes the following improvements: easy-to-read routes, de-emphasized details (in comparison to the geographic data 1100 in FIG. 11), excluded irrelevant data (in comparison to the geographic data 1100 in FIG. 11), distinct and/or simplified geographic features (in comparison to the geographic data 1100 in FIG. 11), eliminates clutter (in comparison to the geographic data 1100 in FIG. 11), easy-to-use, and/or multiple routes for a destination. It is to be appreciated that the enhanced schematic destination map can be stream-lined based at least in part upon a road hierarchy selection.

Figure 13:
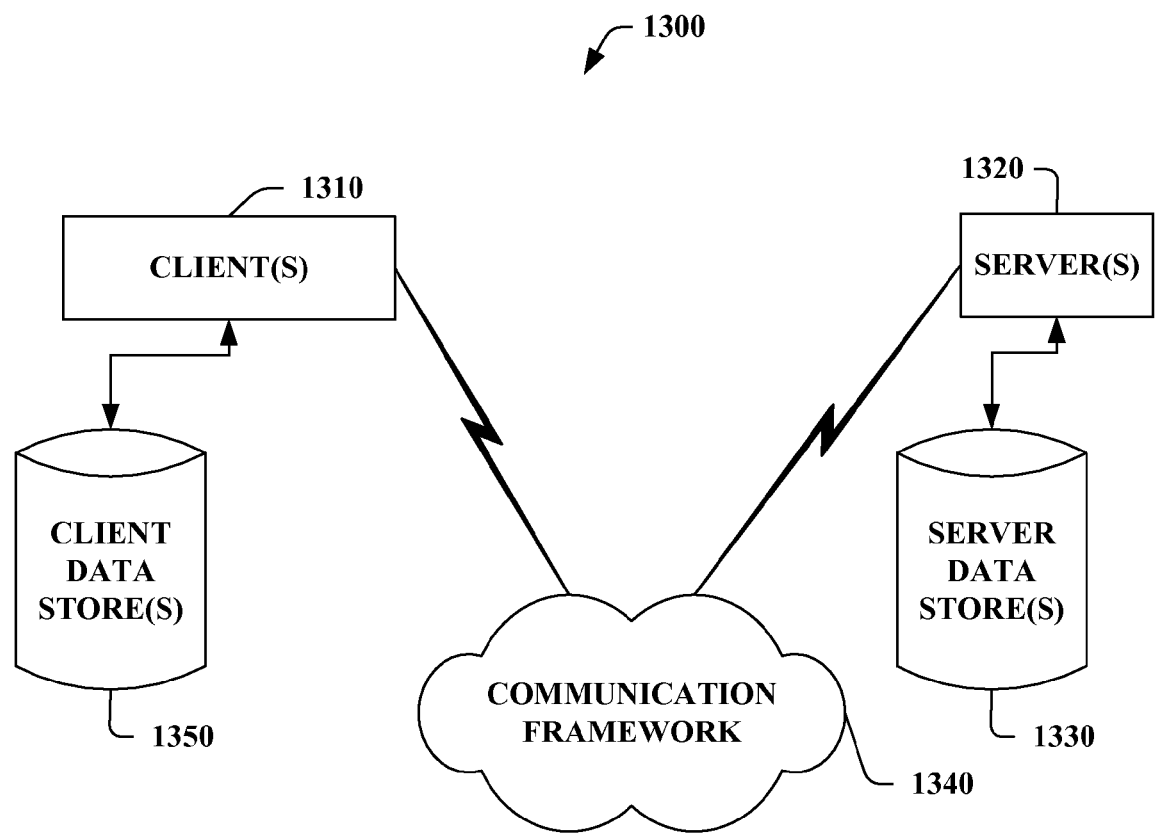
FIG. 13 illustrates an exemplary networking environment, wherein the novel aspects of the claimed subject matter can be employed.
Figure 14:
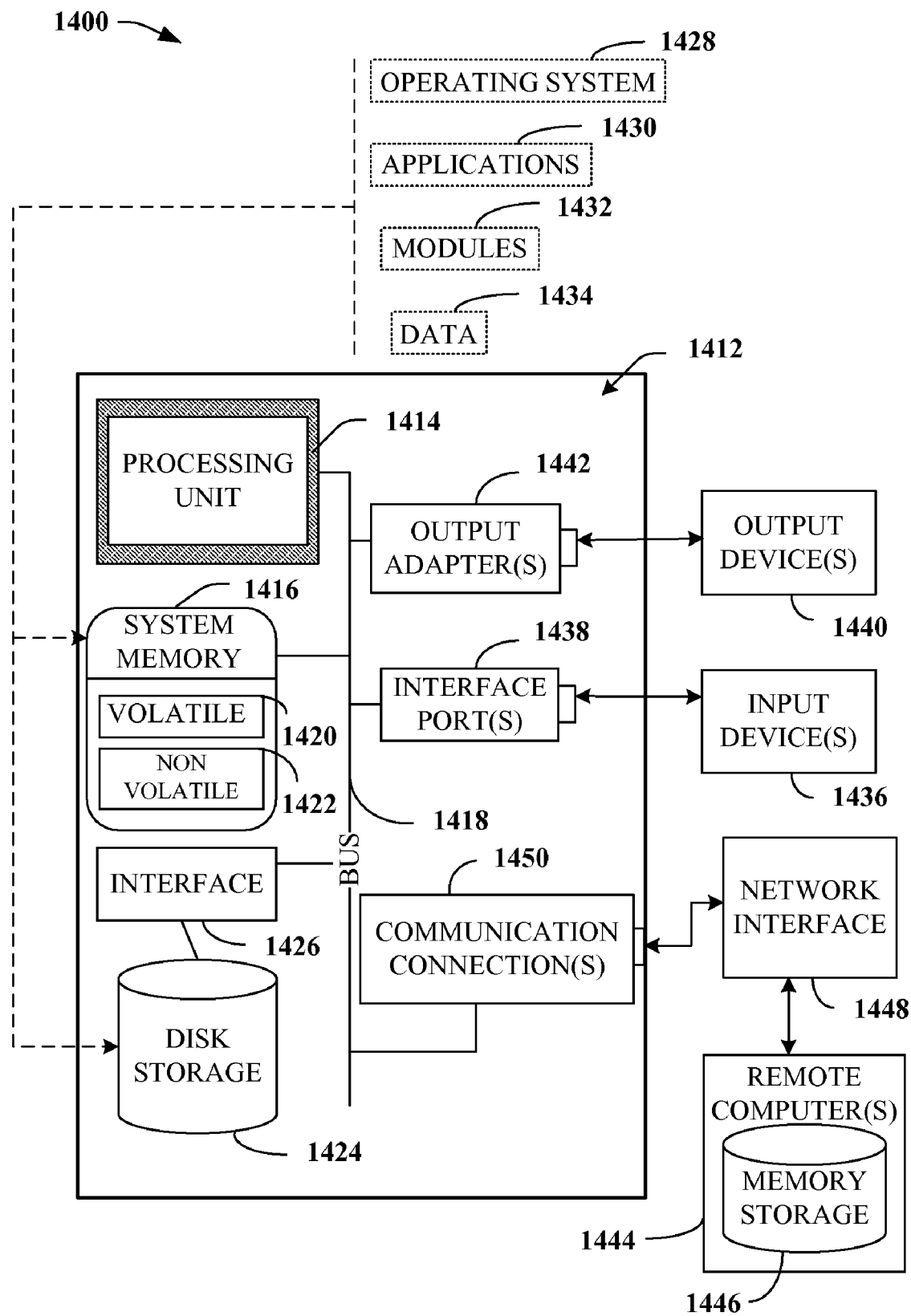
FIG. 14 illustrates an exemplary operating environment that can be employed in accordance with the claimed subject matter.

In order to provide additional context for implementing various aspects of the claimed subject matter, FIGS. 13-14 and the following discussion is intended to provide a brief, general description of a suitable computing environment in which the various aspects of the subject innovation may be implemented. For example, an automatic schematic map generator that automatically produces an enhanced schematic destination map, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 13 is a schematic block diagram of a sample-computing environment 1300 with which the claimed subject matter can interact. The system 1300 includes one or more client(s) 1310. The client(s) 1310 can be hardware and/or software (e.g., threads, processes, computing devices). The system 1300 also includes one or more server(s) 1320. The server(s) 1320 can be hardware and/or software (e.g., threads, processes, computing devices). The servers 1320 can house threads to perform transformations by employing the subject innovation, for example.

One possible communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the servers 1320.

With reference to FIG. 14, an exemplary environment 1400 for implementing various aspects of the claimed subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates providing directions to a destination related to geography, comprising:
    a processing unit;
    an interface component that receives a geographic destination; and
    a map generator executable by the processing unit to automatically create a map including the geographic destination, the map generator including a selection component executable by the processing unit to:
        identify one or more preferred roads by identifying one or more large-sized roads, one or more mid-sized roads, one or more local-sized roads, or a combination thereof, wherein the one or more mid-sized roads are within boundaries of the one or more large-sized roads or within a predefined radius of the geographic destination, and wherein the one or more local-sized roads are within boundaries of the one or more mid-sized roads or within the predefined radius of the geographic destination; and
        construct a route from an origin to the geographic destination, the route including one or more additional roads that are not included in the one or more preferred roads, and wherein the mare including the geographic destination comprises at least a portion of the one or more preferred roads and the one or more additional roads.

2. The system of claim 1, the geographic destination is a user input.

3. The system of claim 1, the geographic destination is at least one of a location on a map, an address, a street, an intersection, a store, a city, a state, a county, a country, and a building.

4. The system of claim 1, wherein the selection component selectively filters geographic data related to a surrounding region of the geographic destination.

5. The system of claim 4, further comprising a road hierarchy component that hierarchically filters the geographic data with respect to the geographic destination.

6. The system of claim 1, further comprising a label component that populates the map including the geographic destination with at least one of a road label, a prompt road label, a callout, and a landmark.

7. The system of claim 6, the label component implements at least one of the following: avoidance of a label-label collision; avoidance of a label-road collision, maximize distance between a first label and a second label.

8. The system of claim 1, the medium-sized roads includes arterials, state highways, and major roads.

9. The system of claim 1, the local-sized roads includes local streets.

10. The system of claim 1, the large-sized roads includes interstate highways.

11. The system of claim 1, further comprising a shape component that simplifies geometry associated with a portion of at least one road.

12. The system of claim 1, further comprising a road layout component that facilitates creating a road layout for the geographic destination utilizing a stochastic search.

13. The system of claim 1, further comprising a distortion component that renders the map including the geographic destination to maximize clarity by maintaining at least one of a set of intersections, an order respective to intersections, a turn direction between roads, a turn angle, a zone for a road passing, order of length of a road, a separate direction of a divided road, a side-by-side relationship between roads, an above-below relationship roads, and a road orientation.

14. The system of claim 13, further comprising a perturbation component that generates a layout perturbation utilizing articulation point-based scaling.

15. The system of claim 14, further comprising a scoring component that evaluates the layout perturbation to provide a score rank.

16. A machine implemented method that facilitates creating a map, comprising:
receiving a destination by a computer including a processing unit executing an automatic schematic map generator;
identifying, by the computer, one or more preferred roads by identifying one or more lame-sized roads, one or more mid-sized roads, one or more local-sized roads, or a combination thereof, wherein the one or more mid-sized roads are within boundaries of the one or more lame-sized roads or within a predefined radius of the geographic destination, and wherein the one or more local-sized roads are within boundaries of the one or more mid-sized roads or within the predefined radius of the geographic destination;
constructing, by the computer, a route from an origin to the geographic destination, the route including one or more additional roads that are not included in the one or more preferred roads; and
generating, by the computer, a map including the destination that comprises the one or more preferred roads and the one or more additional roads, wherein road lengths on the mare represent an amount of time required to traverse a particular segment of the one or more preferred roads, the one or more additional roads, or a combination thereof.

17. The method of claim 16, further comprising:
applying a distortion based on a soft constraint; and
populating the map with a label.

18. A machine implemented system that facilitates providing directions to a destination related to geography, comprising:
means for receiving at least one geographic destination;
means for identifying one or more preferred roads by identifying one or more large-sized roads, one or more mid-sized roads, one or more local-sized roads, or a combination thereof, wherein the one or more mid-sized roads are within boundaries of the one or more large-sized roads or within a predefined radius of the at least one geographic destination, and wherein the one or more local-sized roads are within boundaries of the one or more mid-sized roads or within the predefined radius of the at least one geographic destination;
means for constructing a route from an origin to the at least one geographic destination, the route including one or more additional roads that are not included in the one or more preferred roads; and
means for generating a mare including the at least one geographic destination that comprises at least a portion of the one or more preferred roads and the one or more additional roads.

* * * * *

UNITED STATES PATENT AND TRADEMARK OFFICE
CERTIFICATE OF CORRECTION

| | | |
|---|---|---|
| PATENT NO. | : 7,715,980 B2 | Page 1 of 1 |
| APPLICATION NO. | : 11/420550 | |
| DATED | : May 11, 2010 | |
| INVENTOR(S) | : David M. Bargeron et al. | |

It is certified that error appears in the above-identified patent and that said Letters Patent is hereby corrected as shown below:

In column 22, line 52, in Claim 1, delete "mare" and insert -- map --, therefor.

In column 23, line 41, in Claim 16, delete "lame" and insert -- large --, therefor.

In column 24, line 2, in Claim 16, delete "lame" and insert -- large --, therefor.

In column 24, line 14, in Claim 16, delete "mare" and insert -- map --, therefor.

In column 24, line 39, in Claim 18, delete "mare" and insert -- map --, therefor.

Signed and Sealed this
Fourteenth Day of June, 2011

David J. Kappos
*Director of the United States Patent and Trademark Office*